United States Patent [19]

Brand et al.

[11] 4,348,811
[45] Sep. 14, 1982

[54] VEE BELT MEASURING APPARATUS

[75] Inventors: Wilhelm Brand; Dietmar Baasner, both of Hanover, Fed. Rep. of Germany

[73] Assignee: Hermann Berstorff Maschinenbau GmbH, Hannover Kleefeld, Fed. Rep. of Germany

[21] Appl. No.: 208,073

[22] Filed: Nov. 18, 1980

[30] Foreign Application Priority Data

Nov. 29, 1979 [DE] Fed. Rep. of Germany ....... 2948087

[51] Int. Cl.³ .............................................. G01B 5/10
[52] U.S. Cl. .................................... 33/125 R; 101/27
[58] Field of Search ........... 73/158; 33/125 R, 134 R, 33/134 A; 101/27; 250/548

[56] References Cited

U.S. PATENT DOCUMENTS

| 1,955,581 | 4/1934 | Gates | 33/125 R |
| 2,318,530 | 5/1943 | Schick et al. | 33/125 R |
| 2,529,161 | 11/1950 | Kelling et al. | 250/548 |
| 2,532,715 | 12/1950 | Haren | 33/125 R |
| 3,065,355 | 11/1962 | Barnes | 250/548 |
| 3,675,747 | 7/1972 | Obermark | 192/48.2 |
| 3,696,511 | 10/1972 | Bixler et al. | 33/125 R |
| 3,711,952 | 1/1973 | Justason | 33/125 R |
| 3,852,739 | 12/1974 | Mohr | 33/125 R |
| 3,956,632 | 5/1976 | Hall et al. | 250/548 |
| 4,063,500 | 12/1977 | Abe | 101/27 |
| 4,091,541 | 5/1978 | DiCiaccio | 33/125 R |
| 4,136,570 | 1/1979 | Zdrahal | 192/84 AA |

FOREIGN PATENT DOCUMENTS

| 1125153 | 10/1960 | Fed. Rep. of Germany . |
| 1499494 | 2/1978 | United Kingdom ............. 33/125 R |
| 386778 | 10/1973 | U.S.S.R. ................................ 101/10 |

Primary Examiner—Stuart S. Levy
Assistant Examiner—David V. Carlson
Attorney, Agent, or Firm—Schwartz, Jeffery, Schwaab, Mack, Blumenthal & Koch

[57] ABSTRACT

Apparatus for measuring the length of vee belts, particularly so that vee belts of closely similar length can be identified and thereby used together in multi-belt drives, comprises a fixed drivably rotatable pulley, a further pulley on a tensioning carriage, a belt to be measured being engaged on the pulleys, a drag chain to couple the carriage to a travel drive or to a tensioning station with tensioning weights, an absolute length measuring device to supply an electronic control and arithmetic unit and recording means to mark the vee belt with a symbol denoting a length tolerance part-range.

10 Claims, 10 Drawing Figures

VEE BELT MEASURING APPARATUS

The invention relates to apparatus for measuring the length of a vee belt.

In the manufacture of vee belts, differences in length are found, resulting from variations in the production processes, although the nominal lengths are the same. These differences in length must come within a certain tolerance range. It has been found, however, that for multi-groove drives vee belts may have two great a difference in effective length, in one and the same set of parallel-running belts, although their effective lengths come within the predetermined tolerance range.

It has therefore already been proposed in German Patent Specification No. 11 25 153 that, after vee belts have been vulcanised, those within the admissible tolerance should be divided into sets having the same average length as one another. This give sets of vee belts for multi-groove drives which run quietly to a great degree. However, if one belt of a set of vee belts fails, the whole set has to be exchanged. Furthermore, with previously proposed measuring machines for this purpose, vee belts of the same effective length can only be divided into sets in a very laborious way.

The invention has among its objects to provide vee belt measuring apparatus with which vee belts can be measured simply and rapidly and, within a determined length tolerance, can be allocated to a part-range of that tolerance. The invention is based on the realisation that for multi-groove drives it is sufficient to combine vee belts within narrow tolerance part-ranges. The measuring machine must be constructed so as to facilitate the carrying out of the measuring process.

According to the invention there is provided apparatus for measuring the length of a vee belt, comprising two vee belt measuring pulleys with a variable distance between their axes, one pulley being drivable for rotation and the other pulley being mounted on a tensioning carriage which can travel along a machine bed; a drag chain fixed to the tensioning carriage and couplable either to a travel drive or to a tensioning station provided with tensioning weights; an absolute length measuring device; an electronic control and arithmetic unit to receive an input from the absolute length measuring device, the control and arithmetic unit having an assessing circuit which compares the actual measured value of the length of the vee belt with stored values of part-ranges of the appropriate length tolerance; and a recording means to mark the vee belt being measured, when it has been measured and allocated to a tolerance part-range.

The vee belt measuring pulleys are moved towards one another by the travel drive acting on the drag chain of the tensioning carriage, so that the vee belts can be engaged on them. Data concerning the shape of the vee belt and its nominal length are fed into the control and arithmetic unit containing the assessing circuit. Thus the length tolerance corresponding to this nominal length of vee belt is calculated from a length tolerance formula in the memory and read back. The drag chain fixed to the tensioning carriage is coupled to the tensioning station, so that the tensioning weights become effective. After a few revolutions of the vee belt one revolution is assessed as the measuring run. The length determined from the vee belt is the mean value between the maximum and minimum lengths. The length measured is classified by the control and arithmetic unit which assigns the actual length to a stored value of the possible tolerance part-ranges, and transmits a corresponding control pulse to a stepping motor of the recording means. The recording means marks the particular tolerance range on the vee belt. The tensioning carriage then moves back with the movable measuring pulley towards the stationary measuring pulley, so that the vee belt can be removed. A vee belt which comes within the allowable length tolerance is allocated by a simple process to a part-range of that tolerance. Belts which come outside the allowable length tolerance are recognised as rejects and not stamped.

Preferably the tensioning carriage substantially comprises two part carriages which can be locked together, a first of the two part carriages has a dual-action pressure medium cylinder, the piston rod of which is connected to the second part carriage; said first part carriage is joined to the drag chain; and the drag chain can be coupled either to the travel drive for moving the tensioning carriage or to the tensioning station.

The two part construction of the tensioning carriage simplifies the exchanging of vee belts of the same nominal length. The part carriage provided with the dual action pressure medium cylinder remains is a position, once reached, while a number of vee belts of the same nominal length are being measured. The second part carriage, carrying the movable measuring pulley, is displaced by the piston rod of the pressure medium cylinder, to reduce the distance between the axes of the pulleys and at the beginning of the measuring process it is drawn up and locked onto the first part carriage again by the cylinder.

For vee belts of different sizes the standards prescribe different tensioning weights for measuring the length. To simplify the adjustment and bringing into action of the various weights, the tensioning station preferably has an endless chain with disc-shaped tensioning weights hooked onto it, and the weights are guided in a cylinder and can be brought into action in different combinations by means of an arrestable pair of gripping tongs, engaging through apertures in the cylinder. The gripping tongs, which can be arrested, pick up some tensioning weights and put them out of action, according to the weight specified.

Advantageously each tensioning weight has a central hole through which a supporting rod fixed to the endless chain is guided with clearance; the end of the rod is provided with a supporting disc on which the tensioning weights lie; and each of the weights has an extension for engagement by the tongs. The disc-shaped tensioning weights lie on the supporting disc and thereby exert a tensioning force on the tensioning carriage, by means of the supporting rod and the endless chain, when coupled to the drive shaft. The gripping tongs can take up the weight of any number of tensioning weights, so that only the remaining ones of them lie on the supporting disc.

Alternative coupling of the travel drive or tensioning station to the drag chain of the carriage is advantageously provided by a construction in which a first sprocket, with the endless chain looped round it, is seated on a common drive shaft with the travel drive; the first sprocket can be coupled to the drive shaft by a magneto coupling; and the travel drive can be coupled to the drive shaft by a further magneto coupling. Two magneto couplings seated on the drive shaft connect the shaft either to the travel drive or to the tensioning station.

Preferably the tensioning station has a pulling member disposed on the machine frame and engaging in the endless chain. When a plurality of vee belts of the same nominal length are being measured, the pulling member makes it possible to put the tensioning weights out of action during the process of exchanging the vee belts. Another measurement can then be taken immediately by removing the tensile force of the pulling member. Thus a measuring process with advantageous timing is possible. As a result of the initial coupling of the tensioning station to the drive shaft of the carriage chain during engagement by the pulling member, the carriage can regain its once-assumed position after each measuring operation. This position is preferably within the minus-reject range.

Advantageously a rack is disposed on the machine frame parallel with the guide bed of the tensioning carriage, and a pinion of a digitally absolute rotation generator, disposed on the tensioning carriage, engages with the rack. The use of a digitally absolute rotation generator has the advantage that a certain number value is allocated absolutely to each angular step of the pinion engaging in the rack. This specific number value, which represents a numerical value, can be read out by means of engraved sensing elements. The numerical value constitutes the measuring value, which is unchangeably present as a code pattern. This absolute measuring value is available for further processing without any waste of time, and cannot be falsified as a measuring value by interruptions in operation and failure of mains electricity. Each longitudinal position of the tensioning carriage is defined, so that only a single initial calibration of the code pattern of the rotation generator is necessary.

Advantageously the recording means is in the form of a punching device and is located above said one pulley for vertical and horizontal displacement on the machine frame. The punching means is vertically adjusted according to the diameter of the vee belt measuring pulley. After the measuring process the vee belt is stopped and the punching means moved downwards. The fact that the punching means is arranged above the stationary measuring pulley makes it possible to punch without a backing surface. The additional mark for the particular tolerance part-range is preferably impressed adjacent an existing mark showing the nominal length of the vee belt.

The punching means preferably includes a vertical support carried by horizontal pressure medium cylinders mounted on the machine frame, a vertical displaceable guide beam is guided on the support; and a punching plate provided with symbols is mounted rotatably in the guide beam. Horizontal displacement of the punching means brings it into position or moves it away for removal of the vee belt. After the measuring process the vee belt is stopped and the guide beam moved downwards, by means of a pressure medium cylinder which can also be controlled. The punching plate makes an impression of the symbol brought into position on the back of the vee belt.

A punching band can be located between the punching plate and the vee belt to be measured and marked; the band has a heat-fusible coating on the side facing towards the vee belt; and the punching plate can be heated. On downward movement of the punching plate the punching band, provided with a heat-fusible coating, is pressed onto the back of the vee belt by the punching plate. The punching plate is heated, so that a mark corresponding to the symbol on the plate is fused out of the hand and impressed on the back of the vee belt. This additional marking characterizes the particular tolerance part-range within which the average actual length of the vee belt comes.

When a punching band is used it is advantageous for the punching means to include a step-by-step switch known per se for advancing the punching band. The feed movement of the punching band is preferably initiated by upward movement of the punch means after a stamping operation.

The apparatus preferably includes a photoelectric cell to sense an optical mark on the back of the vee belt, the output signals from the cell being fed to the control and arithmetic unit. Thus the cell detects the revolutions of the vee belt and stops the belt in the correct position relative to the punching means.

The invention is diagrammatically illustrated by way of example with reference to the accompanying drawings, in which.

Figure 1:
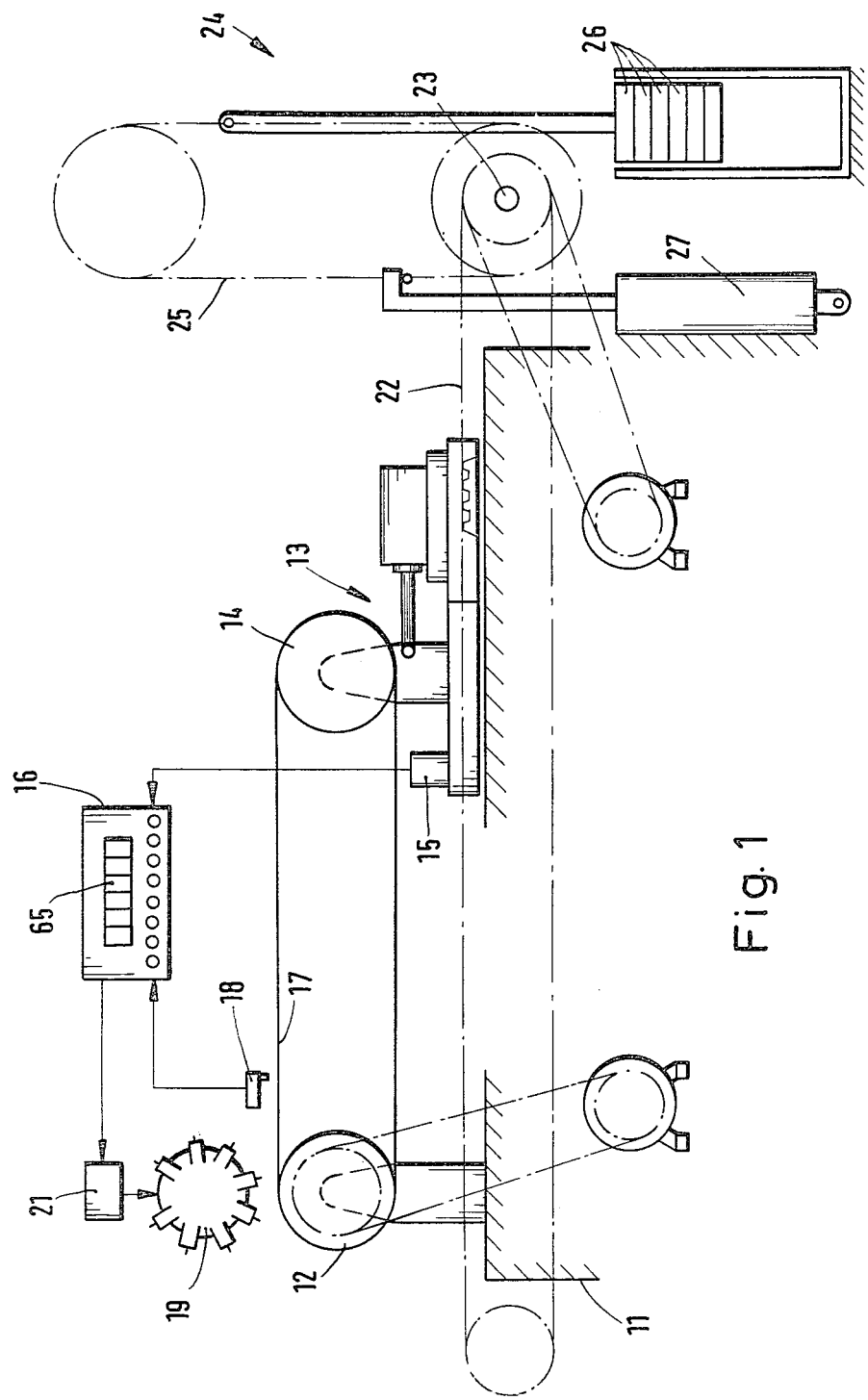
FIG. 1 is a schematic representation of apparatus for measuring the length of a vee belt according to the invention.
Figure 2:
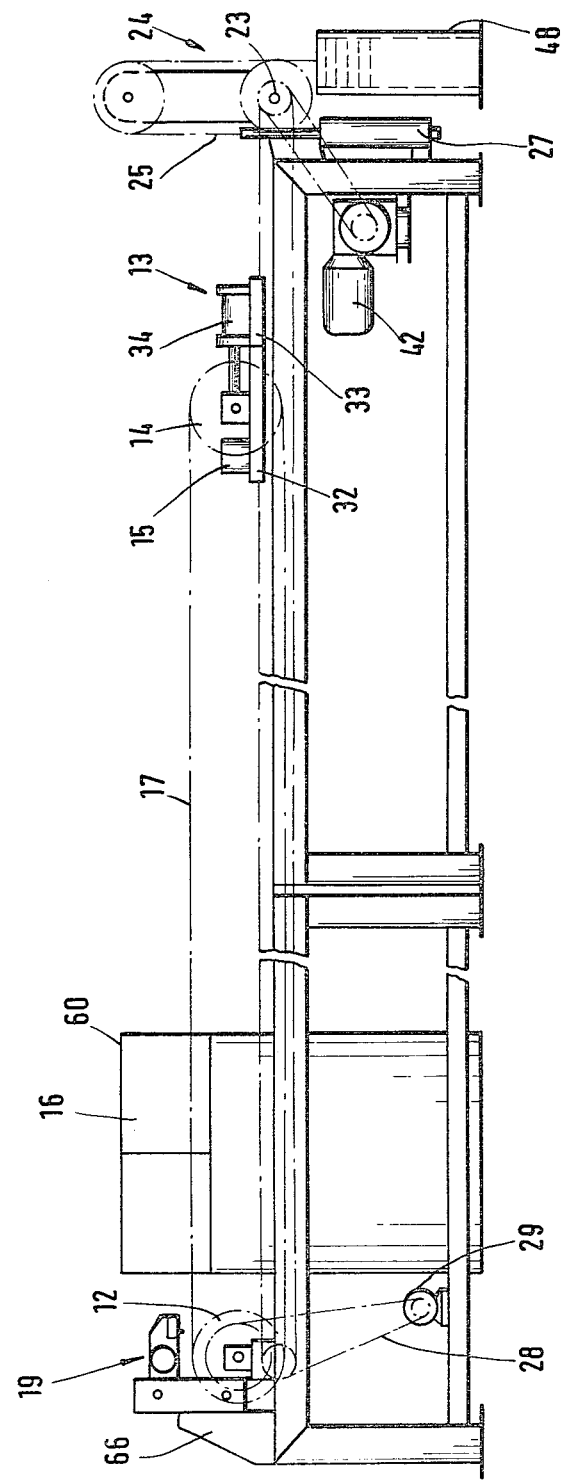
FIG. 2 is an elevation of the apparatus shown schematically in FIG. 1.
Figure 3:
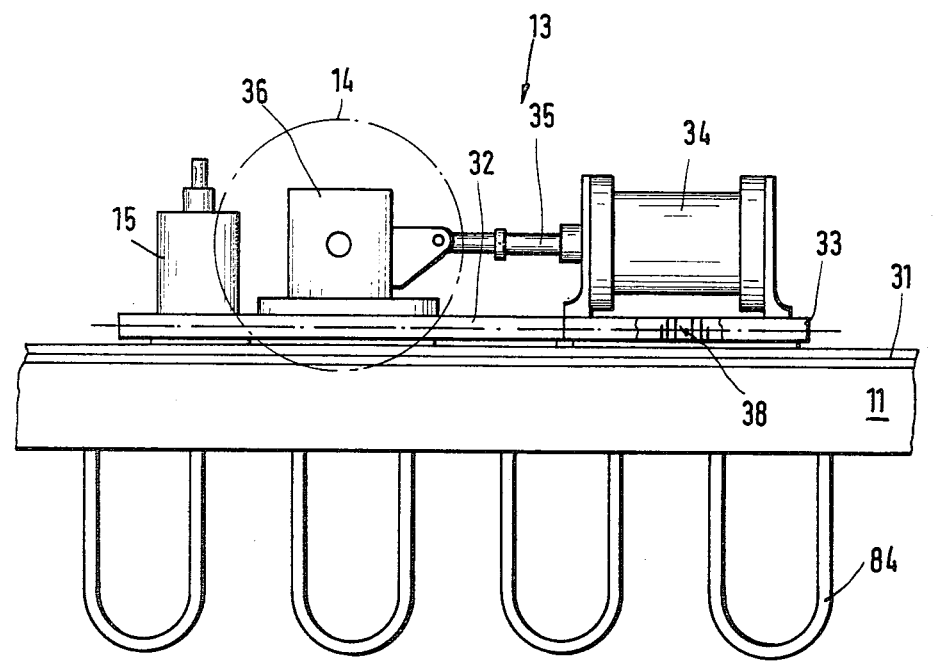
FIG. 3 is on a larger scale to FIG. 2 and shows a two part tensioning carriage, which holds a movable vee belt measuring pulley and which has a distance-dependent rotation generator.
Figure 4:
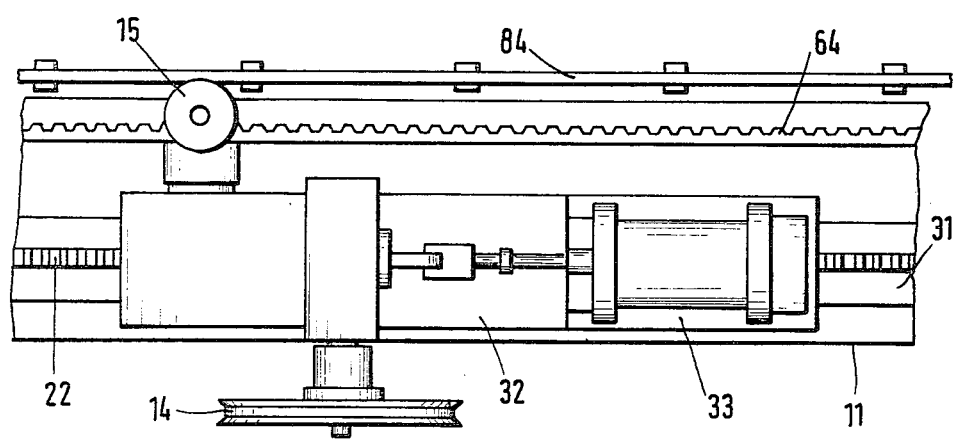
FIG. 4 is a plan view corresponding to FIG. 3.
Figure 5:
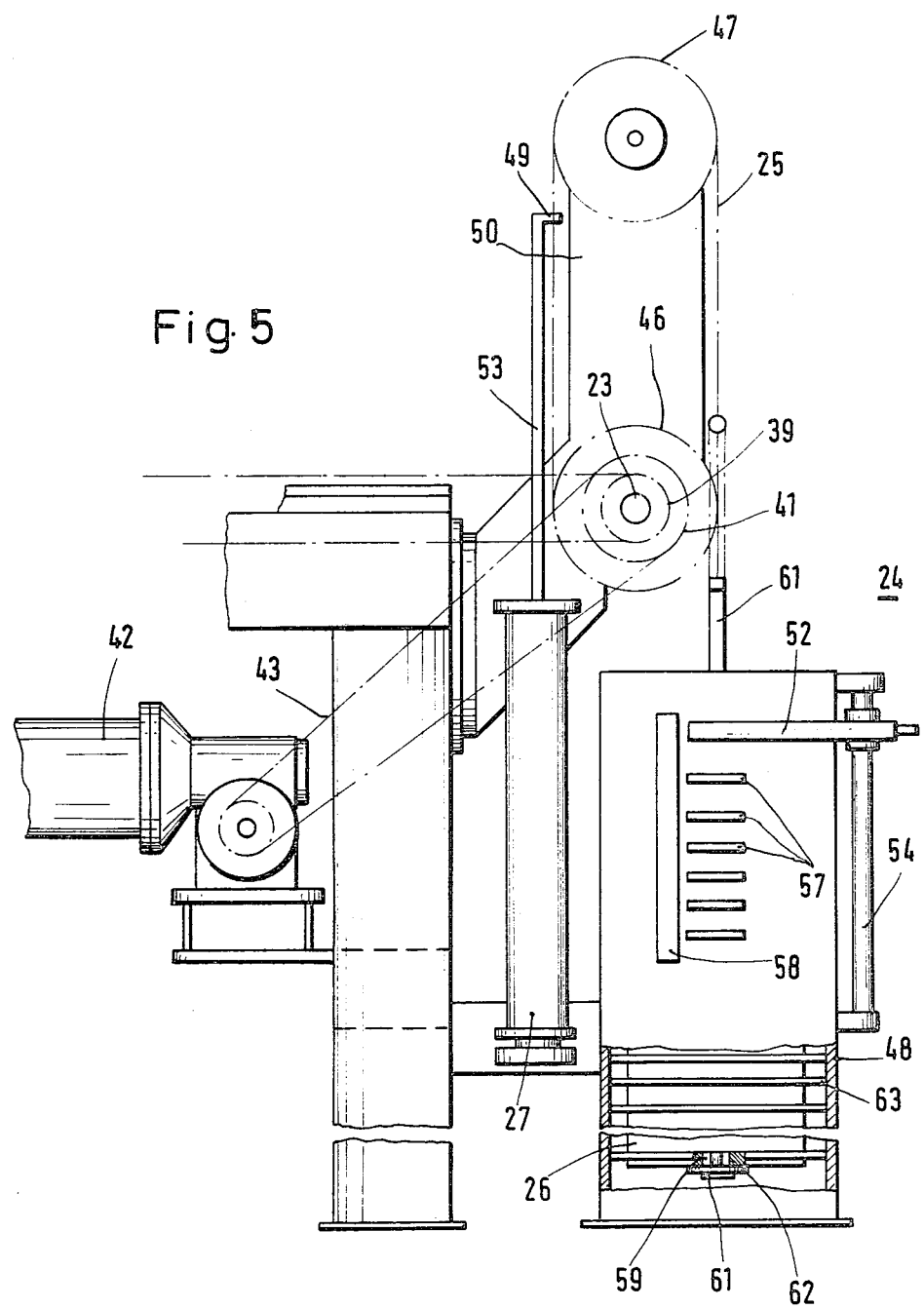
FIG. 5 shows tensioning means of the apparatus of FIGS. 1 to 4.
Figure 6:
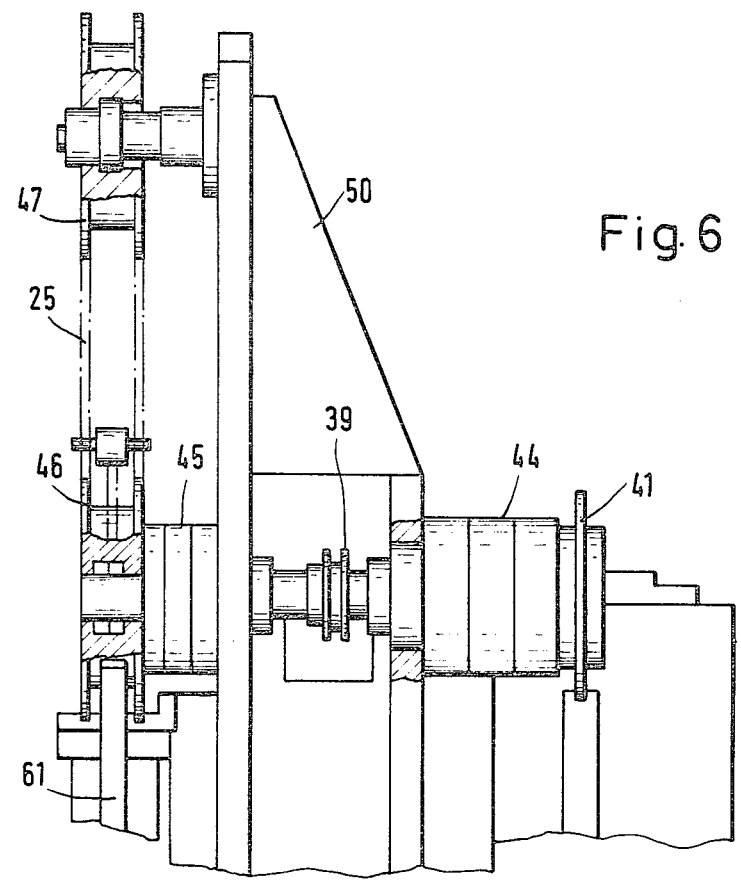
FIG. 6 is a side elevation corresponding to FIG. 5.
Figure 7:
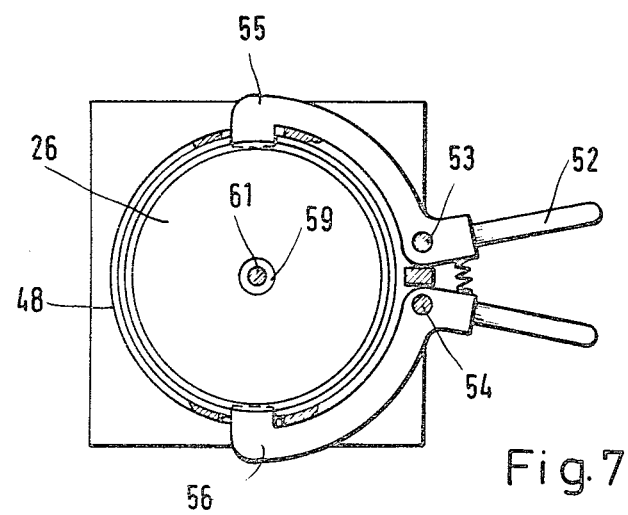
FIG. 7 shows gripping tongs of the apparatus which bring different tensioning weights into action.
Figure 8:
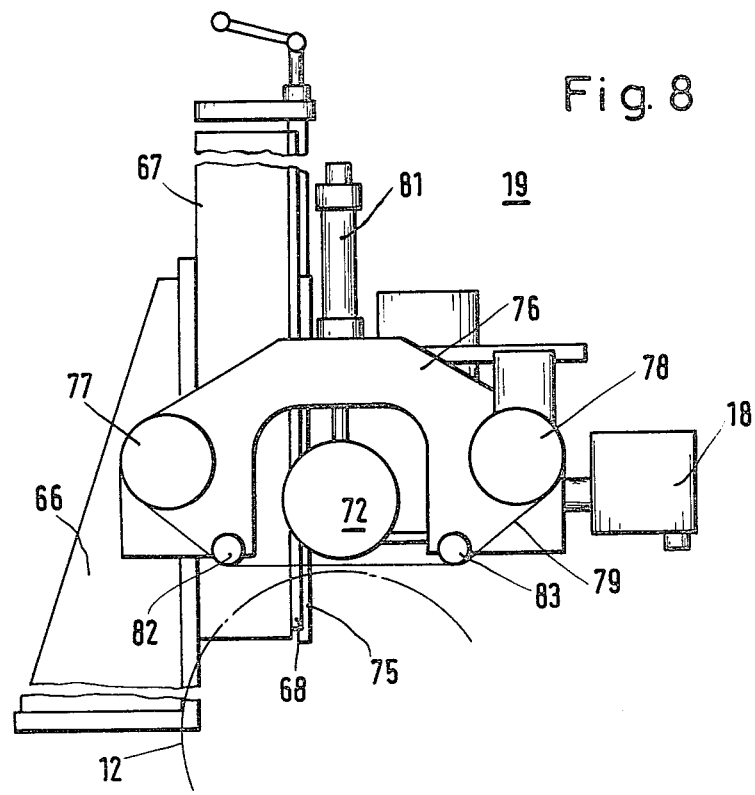
FIGS. 8 and 9 show punching means of the apparatus in side elevation and in plan view.
Figure 9:
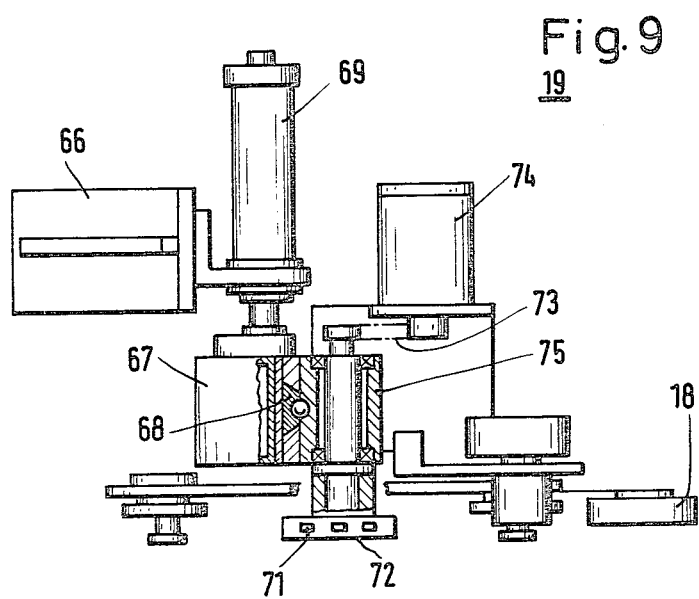

Referring to FIG. 1, a machine frame 11 carries a stationary mounted vee belt measuring pulley 12 and a further movable vee belt measuring pulley 14 which is displaceable by means of a two part tensioning carriage 13. A digitally absolute rotation generator 15 for length measurement is disposed on the carriage 13; values measured by it are coded and supplied to a control and arithmetic unit 16. A signal from a photoelectric cell 18, arranged above the vee belt 17 to be measured, is also supplied to the unit 16. A punching device 19, governed by a control apparatus 21, is disposed above the stationary pulley 12.

The tensioning carriage 13 can be moved by a drag chain 22, which may be driven by means of a shaft 23. The shaft 23 is rotated in a tensioning station 24 which has an endless chain 25. Tensioning weights 26 are suspended from the endless chain 25, and can be put out of action by a pneumatic cylinder 27 which is secured to the machine frame 11.

The individual units of the machine will now be explained in greater detail.

Referring now also to FIGS. 2 to 10, the vee belt measuring pulley 12 mounted stationary on the machine frame 11 can be driven by a DC geared motor 29 by means of a drive chain 28. The speed at which the pulley 12 revolves can be steplessly varied.

The movable vee belt measuring pulley 14 is mounted on the motor-driven tensioning carriage 13, which is located in a guide bed 31 on the machine frame 11. The carriage 13 comprises two part carriages, namely an inner carriage 32 and an outer carriage 33. The inner carriage 32 which is nearer the stationary pulley 12, carries the movable pulley 14 and a digitally absolute rotation generator 15, which records the change of length by means of the change of angle. The outer carriage 33 carries a dual-action pressure medium cylinder 34, the piston rod 35 of which is connected to a bearing block 36 of the movable pulley 14. A trailing cable 84 for the electrical and pneumatic supply is mounted laterally on the machine frame 11.

The tensioning carriage 13 which moves along the guide bed 31 of the machine frame 11 contains a longitudinal recess in its underside, with the drag chain 22 guided through it. The chain 22 is screwed to the outer carriage 33 by appropriate connecting means 38. The drag chain 22 engaging the outer carriage 33 can be driven by a DC geared motor 42 and a chain 43, by means of a sprocket 39 seated on the drive shaft 23 and engaging the drag chain 22 and a further drive sprocket 41 engaging the chain 43.

Two magneto couplings 44 and 45, seated on the drive shaft 23, causes the drive 42, 43 or the tensioning station 24 to act on the drag chain 22. The station 24 includes a sprocket 46 on the drive shaft 23, and a sprocket 47 located above the sprocket 46 and rotatably mounted in a bearing arm 50, which is secured to the machine frame 11. The endless chain 25 moves around the sprocket 47 and has the tensioning weights 26 hooked onto it. These are in disc form and guided in a cylinder 48. The action of the tensioning weights 26 can be terminated by the pneumatic cylinder 27, which is secured to the machine frame 11. The cylinder 27 engages in the chain 25 by means of a catch 49 on its piston rod 51.

The cylinder 48 which guides the weights 26 has a pair of gripping tongs 52 (FIG. 7) which can be adjusted in height on vertical rods 53 and 54 outside the cylinder 48, jaws 55 and 56 of the tongs engaging through apertures 57 in the wall of the cylinder. In this way the individual weights 26 can be brought into action as desired. A weight scale 58 mounted in the vicinity of the apertures 57 gives the operator the necessary information for the total weight which should be set so as to comply with standards.

The disc-shaped tensioning weights 26 each have a central hole 59 which a supporting rod 61 extending through it. At the lower end of the group of weights 26 the rod 61 is joined to a supporting disc 62, to allow the group of weights 26 to be lifted. The disc-shaped weights 26 each have a circular extension 63, under which the jaws 35, 56 of the tongs can engage. The top of the rod 61 is joined to the endless chain 25.

On the inner carriage 32 the digitally absolute rotation generator 15, can record the change in length through a change in angle. A pinion, mounted on the generator 15 but not shown in the drawings, engages in a rack 64 located along the guide bed 31. The generator 15 of the carriage 13 transmits its particular distance-dependent measurement to the programmable, electronic control and arithmetic unit 16, which is accommodated in a switch box 60. The unit 16 has a display 65 of the actual measured length of the vee belt 17. The programmable part of the unit 16 enables a particular desired length of the vee belt to be set, the profile size to be set, the vee belt revolutions to be chosen and the particular standarized length tolerance to be computed on the basis of a length tolerance formula held in store.

A programmed accessing circuit of the control and arithmetic unit 16 is used to check the actual length of the vee belt with predetermined portions A to H of the particular length tolerance range (Tol., FIG. 10) and transmits an output signal to the control apparatus 21 after measurement and evaluation. The control apparatus 21 correctly positions the appropriate symbol of the punch 19 over the stationary vee belt measuring disc 12 and moves the punch 19 down to stamp the back of the belt. All this can be readily done with modern electronic devices. The electronic components for carrying out the described functions are known per se and need not therefore be described in detail.

The punch 19 (FIGS. 8 and 9) is fixed to the machine frame 11 by a bearing bracket 66. The bracket 66 has a vertical support 67 with a dove-tailed guide 68 (FIG. 9) in which the punch 19 is guided for vertical adjustment. Movement of the punch 19 in a horizontal plane, transversely to the vee belt 17, can be effected by pressure medium cylinders 69 fixed to the bracket 66.

A heated punching plate 72 with a plurality of symbols 71 at its periphery is rotatably mounted in a displaceable, vertical guide beam 75 of the punch means 19. The positioning drive for setting whatever symbol 71 has to be punched is provided by a chain 73 driven by a DC stepping motor 74. The motor 74 is controlled by the control apparatus 21 shown in FIG. 1. A yoke-shaped supporting beam 76 fixed to the guide beam 75 carries an unwinding reel 77 and a winding-up reel 78 for a punching band 79 which makes hot impressions. The band 79 is guided over spacing rollers 82 and 83 between the punching plate 72 and the measuring disc 12. A vertical pressure medium cylinder 81 carries out the punching process by pressing down the guide beam 75 carrying the punching plate 72.

The photoelectric cell 18 is fixed to the punch means 19. It senses an optical mark on the back of the vee belt 17 to be measured and thereby generates one output signal per vee belt revolution. This signal is fed to the control and arithmetic unit 16.

The mode of operation of the embodiment described above will now be explained.

When a number of vee belts of identical nominal length are being measured, the nominal length of the belts, the size of their section and a number of belt revolutions is fed into the control and arithmetic unit 16 at the beginning of the measuring operation. The vertical position of the punch means 19 is set to suit the diameter of the vee belt measuring pulley 12. The tensioning force stipulated by a standard is set by application of the gripping tongs 52 to leave appropriate weights 26 effective.

Figure 10:
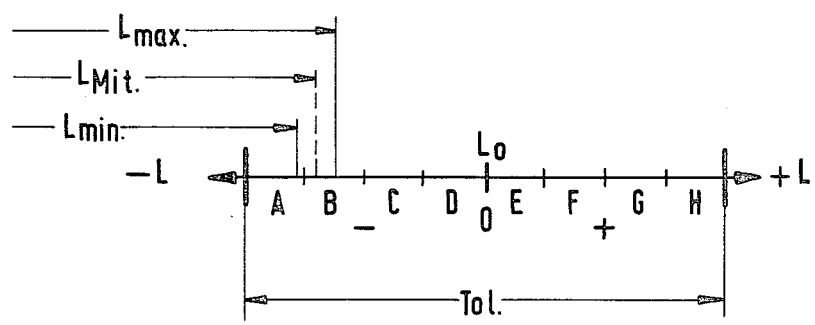
FIG. 10 is a graphic representation of an allowable length tolerance range, with a division into partial ranges.

The drive for the two-part tensioning carriage 13 is actuated, and the carriage 13 moves into a position pre-selected and computed by the control and arithmetic unit 16. This initial position is within the minus reject range of the nominal length for the vee belt (FIG. 10: −L). The pressure medium cylinder 34 of the outer carriage 33 is next actuated. This causes the inner carriage 32 to move towards the fixed vee belt measuring pulley 12 in order to reduce the axial spacing.

In the measuring process which now begins, the magneto coupling 45 for the tensioning station 24 is energised, after which the coupling 44 for the travel drive 42, 43 is disconnected.

The first vee belt 17 to be measured is placed on the two vee belt measuring pulleys 12 and 14. The dual-action pressure medium cylinder 34 of the carriage 13 is acted on so that the inner carriage 32 moves towards and is locked to the outer carriage 33. The punch means 19 is moved in a horizontal plane to a position over the back of the vee belt by the pressure medium cylinder 69.

The pneumatic cylinder 27, which has hitherto put the tensioning weights 26 out of action, is now extended, so that the weights 26 act on the drag chain 22 by means of the drive shaft 23. The DC geared motor 29 is actuated, so that the vee belt 17 moves round. Two revolutions of the belt 17 serve to insert it in the profile of the motoring pulleys 12 and 14. The revolutions of the belt are picked up by the photoelectric cell 18 and transmitted to the control and arithmetic unit 16 through an output signal.

The third revolution of the vee belt is the measuring run. It is always the absolute length which is measured. From the maximum and minimum values measured the unit 16 forms a mean value, representing the actual length of the vee belt 17.

The allowable length tolerance is illustrated graphically in FIG. 10. This length tolerance is divided into eight equal part-ranges A to H. In the measuring example shown here, the maximum length value $L_{max}$ is within the tolerance part-range B, while the minimum length value $L_{min}$ is within the part-range A. The mean value $L_{mit}$ formed from these two length values comes within part-range B.

At the end of the third revolution of the vee belt the drive 28, 29 switches off with a time lag. An assessing circuit of the control and arithmetic unit 16 compares the actual value $L_{mit}$ with the allowable length tolerance and allots it to one of the stored tolerance ranges, here part-range B. The unit 16 thereupon transmits a corresponding control pulse to the control appliance 21, which actuates the DC stepping motor 74 for the punching plate 72, so that the symbol on the punching plate 72 representing the recognised tolerance range B is brought into the punching position. The delayed deceleration of the vee belt 17 has taken place so that the marking of the part-range B is punched behind the usual vee belt stamp.

The guide beam 75 with the punch plate 72 is moved down by the cylinder 81, so that the plate 72 presses the punching band 79 onto the back of the vee belt. Since the plate 72 is heated and the band 79 carries a heat-fusible coating, an impression of the symbol on the plate 72 is made on the back of the vee belt. The punch means 19 then moves up again into the opposite position and horizontally away from the vee belt 17 into the starting position.

The removal process for the marked vee belt 17 is initiated by contraction of the pneumatic cylinder 27. By means of the catch 79 and the endless chain 25 the cylinder 27 pulls the weights 26, thus putting them out of action. The cylinder 34 of the carriage 13 is actuated, so that the inner carriage 32 is displaced so as to reduce the axial spacing. The marked vee belt 17 can be removed from the two measuring pulleys 12 and 14.

The new vee belt of the same nominal length is put on. The measuring process is initiated by contracting the cylinder 34 to move the carriage 32 carrying the measuring pulley 14, by locking, and by extending the pneumatic cylinder 27. Once the punch means 19 has moved into the punching position and the vee belt revolving drive 28, 29 has started, the measuring process described above is repeated.

With the measuring apparatus described above a plurality of vee belts of the same nominal length can be measured easily and rapidly. The belts measured thereafter carry additional marking for the tolerance part-range, thus enabling multi-groove drive units with little difference in the effective length of the belts to be assembled. On failure of a vee belt from a particular multi-groove drive unit, made up of vee belts of the same tolerance part-ranges, all that need be done is to take out the faulty belt and exchange it for a belt carrying the mark for the same tolerance part-range.

If the actual belt length is found to be within the minus reject range ($-L$) or the plus reject rang ($+L$), then no punching of the belt is carried out. A vee belt will also be recognised as a reject and not punched if the minimum and maximum values measured during the last revolution are more than two adjacent tolerance part-ranges apart. This avoids having an inadmissible difference between the effective lengths of the vee belts of one and the same set in multi-groove drives.

What is claimed is:

1. Apparatus for measuring the length of a vee belt, comprising
   (a) a machine bed mounted on a frame;
   (b) first and second measuring pulleys mounted above said bed and each having an axis of rotation;
   (c) a tensioning carriage mounted for longitudinal movement on said machine bed and having mounted thereon said second pulley, movement of said carriage along said machine bed varying the distance between the axes of said pulleys;
   (d) a drag chain fixed to said tensioning carriage for moving the same along said bed;
   (e) a travel drive operatively connected to said drag chain for selectively and alternatively driving said drag chain and thus said carriage in a first direction;
   (f) tensioning means operatively connected to said drag chain for selectively acting on said drag chain for moving said chain and said carriage in the opposite direction, said tensioning means including an endless chain with disc-shaped tensioning weights hooked onto said endless chain, a cylinder to guide said weights and a pair of gripping tongs adjustably mounted on said cylinder, said tongs engaging through apertures in said cylinder to engage said weights selectively in different combinations;
   (g) an absolute length measuring device;
   (h) an electronic control and arithmetic unit adapted to receive an input from said absolute length measuring device, said control and arithmetic unit having an assessing circuit to compare an actual measured value of the length of the vee belt with stored values of part-ranges of an appropriate length tolerance of said vee belt, and
   (i) recording means to mark the vee belt if it has been measured and allocated to a tolerance part-range.

2. Apparatus as claimed in claim 1, wherein said tensioning carriage comprises inner and outer carriage parts which can be locked together, said outer carriage part mounting a dual-action pressure medium cylinder the piston rod of which is connected to said inner carriage part; said outer carriage part being jointed to said drag chain, and said drag chain being coupled alternatively to said travel drive for moving said tensioning carriage, and to said tensioning means.

3. Apparatus as claimed in claim 1, wherein each of said tensioning weights has a central hole through which a supporting rod fixed to said endless chain is guided with clearance, the lower end of said rod being provided with a supporting disc on which said tensioning weights lie, with each of said weights having an extension for engagement by said tongs.

4. Apparatus as claimed in claim 1, further including a sprocket, said endless chain being looped round said sprocket, said sprocket being seated on a common drive shaft for said travel drive, a first magneto coupling for coupling said sprocket to said drive shaft, and a second magneto coupling for coupling said travel drive to said drive shaft.

5. Apparatus as claimed in claim 1, wherein said tensioning means further includes a pulling member disposed on said machine frame and engaging in said endless chain.

6. Apparatus as claimed in claim 1, wherein said absolute length measuring device comprises a digitally absolute rotation generator mounted on said tensioning carriage and having a pinion, and further including a rack extending longitudinally of said machine bed, said pinion engaging said rack.

7. Apparatus as claimed in claim 1, further including a photoelectric cell adapted to sense an optical mark on the back of the vee belt, output signals from said cell being fed to said control and arithmetic unit.

8. Apparatus as claimed in claim 1, wherein said recording means comprises punching means located above said one of said pulleys, and means for vertically and horizontally displacing said punching means.

9. Apparatus as claimed in claim 8, wherein said punching means includes a vertical support carried by horizontal pressure medium cylinders mounted on said machine frame, a vertically displaceable guide beam guided on said support, and a punching plate provided with symbols mounted rotatably in said guide beam.

10. Apparatus as claimed in claim 9, further including a punching band located between said punching plate and the vee belt to be measured and marked, said band having a heat-fusible coating on the side facing towards the vee belt, and means for heating said punching plate.

* * * * *